(12) United States Patent
Merrill et al.

(10) Patent No.: US 8,406,112 B2
(45) Date of Patent: Mar. 26, 2013

(54) TURNTABLE

(76) Inventors: George Earnest Merrill, Bartlett, TN (US); Robert Edwin Williams, Memphis, TN (US)

(*) Notice: Subject to any disclaimer, the term of this patent is extended or adjusted under 35 U.S.C. 154(b) by 0 days.

(21) Appl. No.: 12/984,506

(22) Filed: Jan. 4, 2011

(65) Prior Publication Data

US 2012/0008488 A1 Jan. 12, 2012

Related U.S. Application Data

(60) Provisional application No. 61/292,029, filed on Jan. 4, 2010.

(51) Int. Cl.
*G11B 3/64* (2006.01)
(52) U.S. Cl. ........................................... 369/264
(58) Field of Classification Search ....... 369/264–271.1, 369/274.1, 248
See application file for complete search history.

(56) References Cited

U.S. PATENT DOCUMENTS

| | | | | |
|---|---|---|---|---|
| 3,218,081 A | * | 11/1965 | Gentilini | 369/267 |
| 3,309,094 A | * | 3/1967 | Stanton | 369/269 |
| 3,786,288 A | | 1/1974 | Joannou | |
| 4,106,776 A | | 8/1978 | Gillespie | |
| 4,202,551 A | | 5/1980 | Darnall, Jr. | |
| 4,365,326 A | * | 12/1982 | Ohsawa et al. | 369/268 |
| 4,368,530 A | | 1/1983 | Darnall, Jr. | |
| 4,369,950 A | | 1/1983 | Zopf | |
| 4,475,184 A | | 10/1984 | Cooper et al. | |
| 4,528,653 A | * | 7/1985 | Asano | 369/41.01 |

FOREIGN PATENT DOCUMENTS

| | | |
|---|---|---|
| EP | 0017004 B1 | 7/1983 |
| JP | 55038666 A * | 3/1980 |

* cited by examiner

*Primary Examiner* — Thang Tran

(57) ABSTRACT

An improved turntable is described with inherent properties for reducing noise generated by external sources or by the parts of the turntable. The plinth of the turntable is comprised of an elastomeric layer and at least one stiffening layer that adds rigidity to the plinth. The support feet, spindle bearing, and armboard only come into contact with the elastomeric layer, which dampens energy, allowing the turntable produce the audio on the record without excessive noise.

18 Claims, 5 Drawing Sheets

TURNTABLE

CROSS-REFERENCES TO RELATED APPLICATIONS

This application claims the benefit of U.S. Provisional Application No. 61/292,029 filed Jan. 4, 2010 and incorporated herein by reference in entirety.

FIELD OF THE INVENTION

The present invention is generally directed toward a new turntable with improved noise reduction properties.

BACKGROUND OF THE INVENTION

Turntables, also known as record players, work through the transduction of mechanical vibrations of the needle into an electrical signal which can then be amplified. Turntables are susceptible to various sources of noise and vibration which are amplified along with the recorded sound, and which can interfere with the enjoyment of the recording. The noise and vibration are "energy intrusions" that degrade the quality of signal produced by the turntable.

There are three general sources of energy intrusion that affect a turntable: airborne, mechanical, and internal noise generated by the turntable itself. Airborne energy contained within the environment includes sounds that cause the turntable to vibrate. These vibrations are picked up by the turntable and amplified. Mechanical noise includes vibrations from the environment that travel through the support feet of the record player. For example, nearby traffic, subways, construction, or even footsteps will cause the turntable to vibrate. Finally, a turntable has its own internal sources of energy which will be amplified and negatively affect the sound. These include energy generated from the motor, drive system, platter support bearings, and tone arm release energy as well as energy generated by stylus to groove contact during tracking of the record.

The presently disclosed turntable solves the problem of unwanted noise by isolating the intruding energy. The reduction in energy intrusions results in a cleaner signal.

SUMMARY OF THE INVENTION

An improved turntable with vibration isolating properties is disclosed. This improved turntable reduces vibration through a unique plinth material, internal bracing, and vibration absorbing feet. As a result, the turntable reproduces the recorded audio more faithfully and without unwanted noise.

The claimed device comprises a turntable with a plinth made of composite material with both firm and elastomeric layers, a noise reducing platter, internal bracing, and noise-reducing feet.

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1:
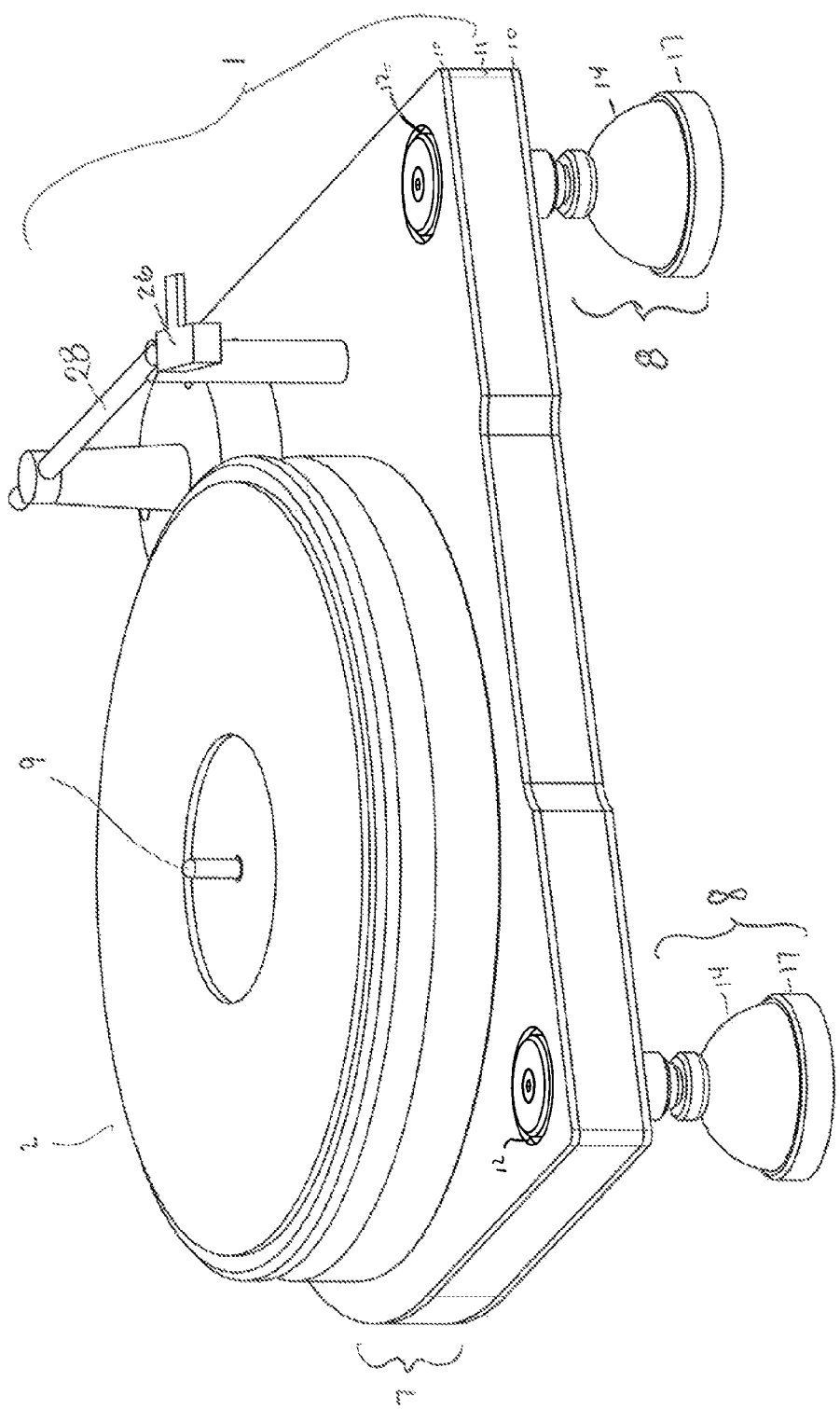
FIG. 1 depicts a perspective view of the turntable.
Figure 2:
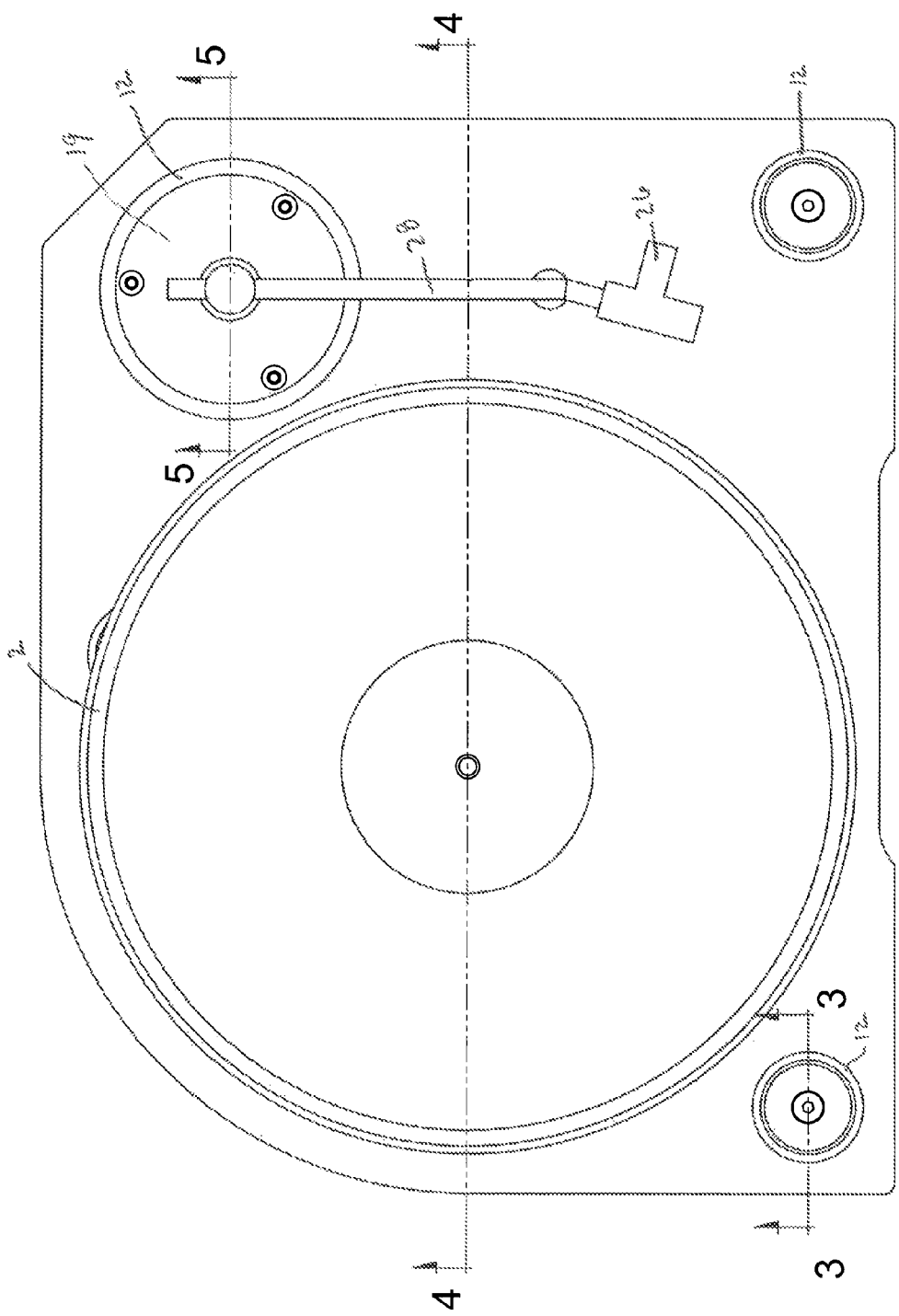
FIG. 2 is a top plan view of the turntable.
Figure 3:
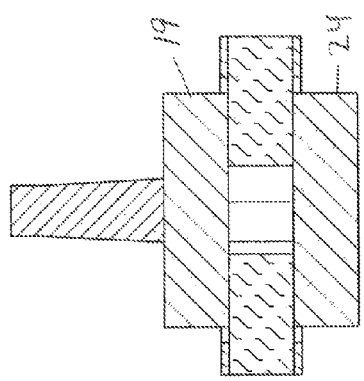
FIG. 3 is a cross sectional view of the feet as viewed along line 3-3 of FIG. 2.

Referring to the drawings, FIG. 1 illustrates an exemplary embodiment of the improved turntable. The turntable 1 consists of a rotating platter 2 that supports a phonograph record, a drive source 3 for this platter (such as a motor, pulley, and belt), a plate (also known as the plinth 7, base, or chassis) to mount the bearing 4 for the rotating platter 2, motor mounting, and pickup arm mounting. Support feet 8 are used to raise and support the plinth 7 while further reducing intruding energy.

The rotating platter 2 can be manufactured from any solid material. In a preferred embodiment it is made of a compound containing Bakelite, cellulose and resin. This compound has a high density, a low resonance top, and dimension stability. These characteristics make it ideal for reducing energy intrusion.

Preferably a rubber cork compound mat is used to place the record upon the rotating platter 2, thus aiding to quell vibrations within the vinyl as the stylus 26 is tracking the grooves of the record. However, a felt mat or rubber mat may also be employed.

The rotating platter 2 design and material consideration along with the mat control the internal energy that is generated by the stylus 26 making contact with the grooves of the record during tracking.

In one embodiment, the platter shaft 9 is manufactured from precision ground stainless steel with a hardened thrust ball placed at the end. The platter is supported by a bearing 4 manufactured from graphite impregnated nylon or preferably molybdenum disulfide impregnated nylon. A hardened surface is provided at the bottom of this bearing 4 to allow the shaft thrust ball to ride with virtually no friction, thus preventing additional noise.

The plinth 7 also greatly reduces energy intrusion. The plinth 7 is the heart of the turntable that supports all three energy generating parts: the motor, bearing/spindle, and tone arm.

Figure 6:
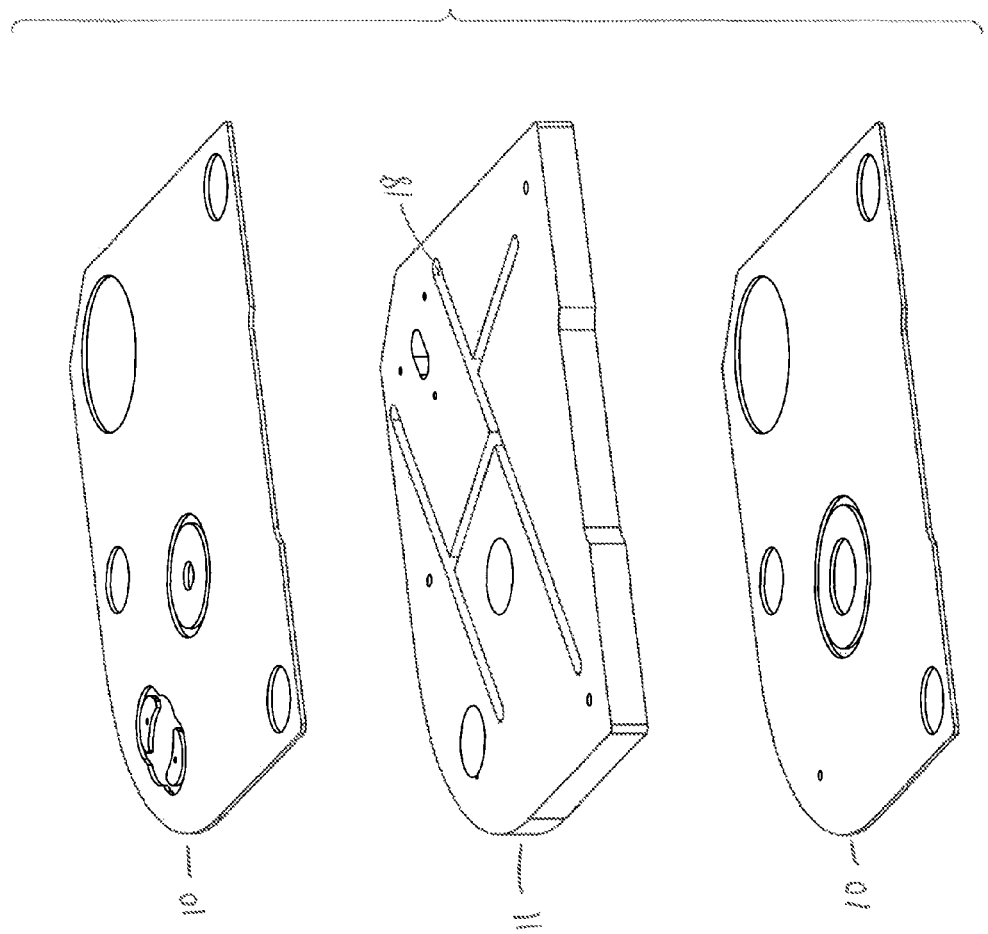
FIG. 6 is an exploded view of the turntable plinth.
Figure 7:
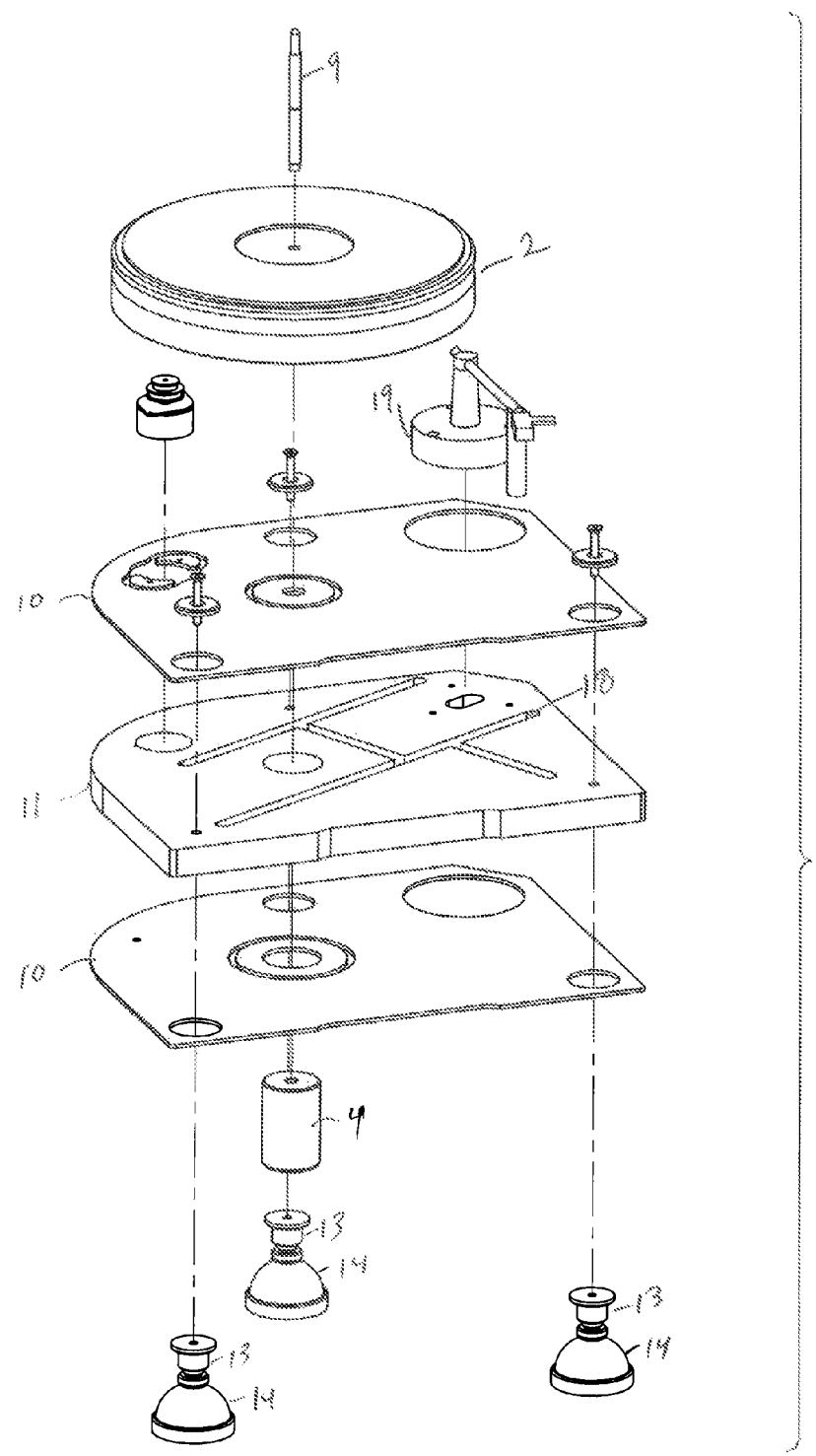
FIG. 7 is an exploded view of the turntable as a whole.

The plinth 7 has a novel construction that significantly reduces energy intrusion. As can be seen in FIG. 6, the plinth 7 is constructed from a laminate of an elastomeric layer 11 or other elastomer sandwiched between stiffening layers 10. The elastomeric layer is preferably a dense rubber with a durometer of 80, but any elastomeric material may be used. This stiffening layers 10 are preferably made of a hard material. such as carbon fiber, aluminum, or plywood. The elastomeric layer 11 absorbs vibration and energy, while the stiffening layer 10 provides structure and support. The operating parts of the turntable that produce energy, such as the motor, spindle, and tonearm do not come into contact with the stiffening layer 10. Instead, the stiffening material is cut away from the laminate, and these operating parts are attached directly to the elastomeric layer 11. The space between the operating parts and the sidewalls of the stiffening material is known as energy isolation valleys 12. These gaps in the stiffening layer 10 of the laminate material prevent the operating parts from transmitting energy directly to the stiffening layers 10. Vibrational energy travels easily through hard material without significant dampening. However, vibrational energy does not travel well through elastomeric materials because the elastomeric materials absorb much of the energy. The unique composite laminate material of the plinth 7 absorbs vibrational energy while providing rigidity to support the platter. The advantage of this system is that energy developed by each of these operating parts is only transmitted through the elastomeric layer 11, and is absorbed and dissipated by the elastomeric layer 11 before it can intrude and affect the other parts. For example the motor energy is dissipated before it can affect the energy release from the pickup arm.

To reduce the possibility of sagging, spar bracing 18 may also be introduced into the elastomeric layer 11 of the laminate to further support the weight of a heavy platter. In an alternative embodiment, added stiffening material may be used to directly connect the stiffening layers 10 to form a rigid truss. For example, in one embodiment a 1.25 inch aluminum cylinder strut is placed through a hole in the elastomeric layer 11 and the top and bottom of the cylinder are glued to the top and bottom aluminum stiffening layers respectively, thus increasing the rigidity of the plinth.

Figure 4:
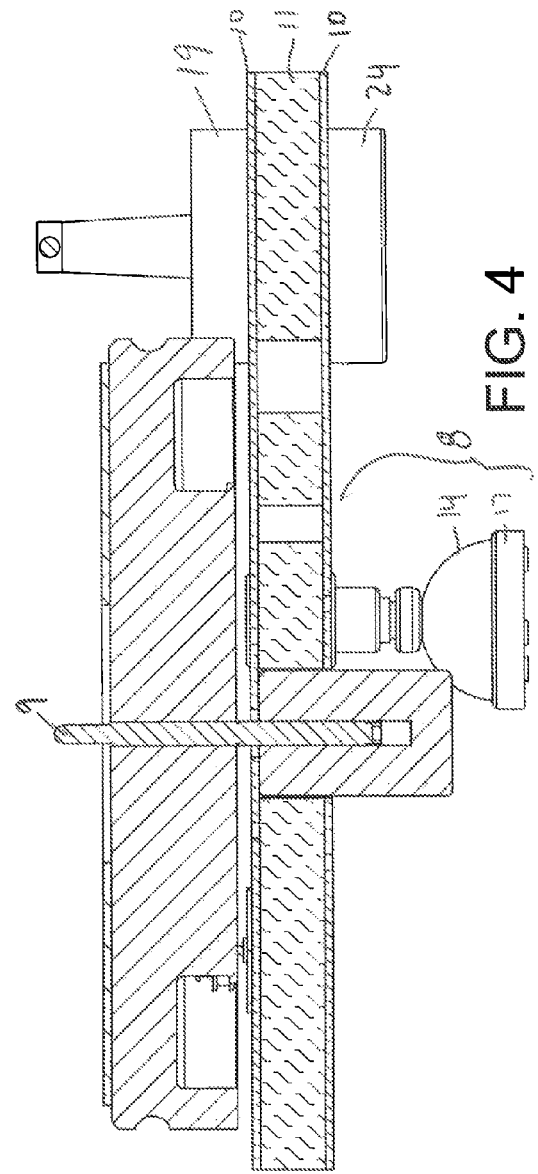
FIG. 4 is a cross sectional view of the turntable as viewed along line 4-4 of FIG. 2.
Figure 5:
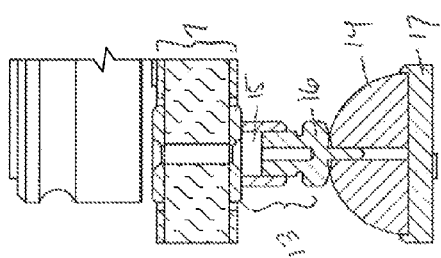
FIG. 5 is a cross sectional view of the tonearm mount as viewed along line 5-5 of FIG. 2.

The tone arm mounting system accomplishes the dissipation of tonearm release energy by using an energy transfer tonearm mounting platform coupled to the damping elastomeric layer 11. As can be appreciated by FIG. 4 and FIG. 5, the tone arm 28 is mounted to an upper armboard 19. The upper armboard 19 rests directly on the elastomeric layer 11 in an area that is absent of stiffening layers 10. An isolation valley 12 exists between the upper armboard 19 and the stiffening layer 10 around it. This isolation valley 12 prevents the armboard from coming in contact with the stiffening layer 10. Upper armboard 19 is secured to lower armboard 24 by fasteners that pass through elastomeric layer 11. These fasteners allows for easy adjustment of the arm mounting in all three directions so that the armboard 19 is parallel to the rotating platter 2.

Mechanical energy intrusion from the surface that the turntable 1 rests upon is managed by a system called the isolation support foot 8 which consists of an inverted hemisphere 14 consisting of an elastomeric material. An adjustable support column 13 is attached to the elastomeric layer 11 of the plinth 7 and is resting upon a inverted hemisphere 14, preferably made of highly absorbent rubber. This support column 13 utilizes a positioning pin to hold the foot 8 in place. The support column 13 consists of two parts: the height adjustment collar 15 and the hemisphere coupler with positioning pin 16. A bolt is inserted through a compressing washer and the plinth elastomeric layer 11 into the hemispherical coupler, drawing the adjustment collar 15 and hemispherical coupler 16 tightly together. This creates a support column 13 that is extremely solid while still having height adjustment capabilities. The curved face on the hemispherical coupler 16 varies contact with the inverted hemisphere 14 which changes the spring rate, further helping to subdue energy transmission.

The flat of the hemisphere is placed in a support base 17 to allow retention of its shape and for uniform input of energy into the foot. The feet are designed such that only elastomeric portions of the feet come into contact with the elastomeric portion of the turntable, thus ensuring that energy is significantly dampened.

Airborne energy is dampened by the overall energy absorbing capability of the laminate 7, feet 8, and rotating platter 2. As a result, the whole turntable is virtually impervious to airborne energy encountered in a normal listening environment It should be understood that features of any of these embodiments may be used with another in a way that will now be understood in view of the foregoing disclosure. Although the present invention has been described and illustrated with respect to at least one preferred embodiment and use therefor, it is not to be so limited, since modifications and changes can be made therein which are within the fully-intended scope of the invention.

We claim:

1. A turntable comprising a plinth which is further comprised of an elastomeric layer and a stiffening layer, wherein said stiffening layer is in contact with said elastomeric layer except in an energy isolation valley, wherein said energy isolation valley is an area of said plinth that is not in contact with said stiffening layer.

2. The turntable of claim 1 further comprising an armboard mounted within said energy isolation valley.

3. The turntable of claim 1 further comprising a drive source mounted within said energy isolation valley.

4. The turntable of claim 1 further comprising a support foot mounted within said energy isolation valley.

5. The turntable of claim 1 further comprising a spindle bearing mounted within said energy isolation valley.

6. The turntable of claim 1 further comprising internal bracing in said plinth.

7. The turntable of claim 1 further comprising stiffening material connected to said stiffening layer.

8. The turntable of claim 1 further comprising a rotating platter composed of a compound containing Bakelite, cellulose, and resin.

9. The turntable of claim 1 further comprising a mat composed of a material selected from the group consisting of rubber cork compound, felt, and rubber.

10. The turntable of claim 1 further comprising a platter shaft composed of stainless steel.

11. The turntable of claim 2 wherein adjustable fasteners are used to mount said armboard within said energy isolation valley.

12. The turntable of claim 4 wherein said support foot is composed of an elastomeric support material.

13. The turntable of claim 12 wherein said elastomeric support material is in the shape of an inverted hemisphere.

14. The turntable of claim 4 wherein said support foot further comprises an adjustable height column.

15. The turntable of claim 5 wherein said spindle bearing is composed of molybdenum disulfide impregnated nylon.

16. The turntable of claim 5 wherein said spindle bearing is composed of graphite impregnated nylon.

17. The turntable of claim 15, wherein the plinth further comprising internal bracing.

18. The turntable of claim 15, wherein the plinth further comprising stiffening material connected to said stiffening layer.

* * * * *